(12) United States Patent
Hofmann et al.

(10) Patent No.: US 7,736,025 B2
(45) Date of Patent: Jun. 15, 2010

(54) ILLUMINATION SYSTEM COMPRISING MECHANICAL DIMMING DEVICE

(75) Inventors: Bernd Hofmann, Aachen (DE); Roger Jean Quirinus Van Den Plas, Lille-Wechelderzande (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 224 days.

(21) Appl. No.: 11/911,817

(22) PCT Filed: Apr. 11, 2006

(86) PCT No.: PCT/IB2006/051103
§ 371 (c)(1),
(2), (4) Date: Oct. 18, 2007

(87) PCT Pub. No.: WO2006/111885
PCT Pub. Date: Oct. 26, 2006

(65) Prior Publication Data
US 2008/0180951 A1    Jul. 31, 2008

(30) Foreign Application Priority Data
Apr. 18, 2005 (EP) ................. 05103061
Aug. 18, 2005 (EP) ................. 05107596

(51) Int. Cl.
*F21V 9/00* (2006.01)
(52) U.S. Cl. .............. 362/293; 362/321; 352/207
(58) Field of Classification Search ........... 362/293, 362/277, 321, 322, 281; 359/889, 891, 885; 353/97; 352/141, 207, 210, 212–220
See application file for complete search history.

(56) References Cited

U.S. PATENT DOCUMENTS

| | | | |
|---|---|---|---|
| 4,893,225 A | | 1/1990 | Solomon |
| 5,126,886 A | * | 6/1992 | Richardson et al. ......... 359/888 |
| 5,860,733 A | | 1/1999 | Stone et al. |
| 5,904,417 A | | 5/1999 | Hewett |
| 5,905,561 A | * | 5/1999 | Lee et al. .................. 623/6.31 |
| 6,102,554 A | | 8/2000 | Wynne Willson et al. |
| 6,241,366 B1 | | 6/2001 | Roman et al. |
| 6,687,063 B1 | | 2/2004 | Rasmussen et al. |

(Continued)

FOREIGN PATENT DOCUMENTS

EP      0372932 B1    6/1990

(Continued)

*Primary Examiner*—Stephen F. Husar
*Assistant Examiner*—Peggy A. Neils

(57) ABSTRACT

An illumination system (10), comprising an illumination source (2) and a mechanical dimming device (4) for dimming the amount of light generated by the illumination source (2) and emanating from the lighting apparatus, comprising an array of partially overlapping blades, the array of blades being mechanically operable to define an optical passageway there through of variable cross sectional area, wherein each blade comprises at least one overlapping segment and at least one non-overlapping segment, the overlapping segments being a color filter and the non-overlapping segments being a shutter. In a preferred embodiment the color of the color filter is in the range from yellow to amber to red. This arrangement is especially useful with a high intensity lamp as the illumination source, and provides for natural dimming of the light produced by the illumination source over the range of from about 0 to 100% causing a color change in the projected light that resemble natural sunset.

20 Claims, 4 Drawing Sheets

U.S. PATENT DOCUMENTS 6,769,777 B1 * 8/2004 Dubin et al. ............... 353/97
6,796,682 B2 * 9/2004 Hough et al. .............. 362/268
6,963,457 B1 * 11/2005 Niwa et al. ................ 359/892
6,974,232 B1 * 12/2005 Richardson ............... 362/293

FOREIGN PATENT DOCUMENTS

| WO | 9906758 A2 | 2/1999 |
| WO | 0137032 A2 | 5/2001 |
| WO | 03093725 A2 | 11/2003 |

* cited by examiner

ILLUMINATION SYSTEM COMPRISING MECHANICAL DIMMING DEVICE

TECHNICAL FIELD OF THE INVENTION

The present invention generally relates to an illumination system including an illumination source and a mechanical dimming device. The mechanical dimming device includes a plurality of blades mounted in a movable relationship relative to each other in response to a user input. The blades are movable to define the optical passageway of variable cross sectional area to dim the amount of light generated and emanating from the illumination source passing there through over the range of from about 0 to 100%.

BACKGROUND OF THE INVENTION

Illumination systems including an illumination source and a mechanical dimming device for dimming the amount of light generated by the illumination are used in a variety of situations. In particular, if comprising a high intensity illumination source, such illumination systems are widely used e.g. in stage, television, motion picture or architectural lighting systems. For some types of stage presentations, there may be as many as 300 individual illumination sources. Such illumination systems must be modifiable. E.g. in the control of stage or television stage lighting, a sequence of lighting effects are activated in synchronism with the dramatic action on the stage. Potentially as many as 200 lighting effects must be activated in sequence.

In such applications, it is important to ensure that the light intensity of a given light source can be varied between maximum and zero.

With incandescent lamps, dimming is simply facilitated by reducing the input voltage to the lamp. Reducing the voltage causes a temperature drop of the filament, which consequently changes the color of the light produced. Incandescent light gets redder as voltage is diminished, which is comparable to the natural change of sunlight at sunset.

But incandescent lamp-illuminated projectors are only satisfactory for illumination of small areas.

In practice, in very large halls such as theatres or where outdoor or daylight presentations must be made, high intensity illumination sources must be utilized.

Originally developed for outdoor and industrial applications, high intensity discharge (HID) lamps are also used in office, retail, and other indoor applications.

There are several advantages to HID sources:
relatively long life (5,000 to 24,000+ hrs),
relatively high lumen output per watt,
relatively small in physical size.

However, the following operating limitations must also be considered. First, HID lamps require time to warm up. It varies from lamp to lamp, but the average warm-up time is 2 to 6 minutes. Second, HID lamps have a "restrike" time, meaning a momentary interruption of current or a voltage drop too low to maintain the arc will extinguish the lamp. At that point, the gases inside the lamp are too hot to ionize, and time is needed for the gases to cool and pressure to drop before the arc will restrike. This process of restriking takes between 5 and 15 minutes, depending on which HID source is being used. Therefore, good applications of HID lamps are areas where lamps are not switched on and off intermittently.

Particularly, such illumination systems cannot be dimmed by direct voltage control of the lamp itself since a reduction in current supply to the lamp results in the extinguishing of the lamp. Control of the light intensity of such lamps can only be achieved through a mechanically working dimming device in the light path. Such light valves have taken the form of an iris, similar to that used in cameras, or a set of shutters or flaps likewise adjustable to permit intensity control adjustment by adjusting the opening to pass more or less light according to the needs of the user.

For this purpose, it has been proposed, for instance in U.S. Pat. No. 5,904,417 A, that a lighting apparatus includes a discharge arc lamp illumination source, an elliptical reflector completely surrounding the illumination source for collecting and projecting light from the illumination source, a shutter for dimming the amount of light generated by the illumination source and emanating from the lighting apparatus. The shutter is mechanically operable to define an optical passageway there through of variable cross sectional area. The shutter includes a plurality of shutter blades mounted in a movable relationship relative to each other in response to user input. The shutter blades is movable to define the optical passageway of variable cross sectional area to dim the amount of light from the illumination source passing there through over the range of from about 0 to 100%.

SUMMARY OF THE INVENTION

It is an object of the present invention to provide an illumination system which comprises an illumination source such as a high intensity lamp in combination with a mechanical dimming apparatus to dim the output of the lamp over the range of from about 0 to 100%, causing color changes in the light produced over the dimmed range comparable to natural sunset.

In accordance with the above object and additional objects that will become apparent hereinafter, the present invention provides an illumination system, comprising: an illumination source and a mechanical dimming device for dimming the amount of light generated by the illumination source and emanating from the lighting apparatus, comprising an array of partially overlapping blades, the array of blades being mechanically operable to define an optical passageway of variable cross sectional area, wherein each blade comprises at least one overlapping segment and at least one non-overlapping segment, the overlapping segments being a color filter and the non-overlapping segments being a shutter.

In a preferred embodiment the color of the color filter is in the range from yellow to amber to red.

This arrangement is especially useful with a high intensity lamp as the illumination source, and provides for natural dimming of the light produced by the illumination source over the range of from about 0 to 100% causing a color change in the projected light that resembles natural sunset.

When moved through the pathway of the light beam, each blade comprises a leading edge in the front portion and a beam-stopping edge at the border to the rear portion.

In a preferred embodiment the color of the color filter segment changes from yellow to red from the leading edge to the beam-stopping edge. Thus a dimming device is provided which provides a fade rather than a wipe.

It might also be preferred that the overlapping segment has a dark blue or opaque rim at the beam-stopping edge.

The overlapping segment may comprise a dark blue or opaque rim at the beam-stopping edge.

According to one embodiment of the invention, the dimming device is a Venetian blind-type dimmer with the blades lying horizontally or vertically.

According to one embodiment of the invention, the dimming device is an iris diaphragm-type dimmer with the blades movable to a central aperture.

According to one embodiment of the invention, the dimming device is a hatch-type dimmer with the blades lying horizontally or vertically and pivotable in opposite directions.

According to one embodiment of the invention, the dimming device is a sliding gate-type dimmer with the blades lying horizontally or vertically and moveable in opposite directions.

A reflector may be used in conjunction with the illumination source to better distribute the light more evenly over the full cross sectional area of the light beam.

DETAILED DESCRIPTION OF THE INVENTION

The invention relates to an illumination system, comprising an illumination source and a mechanical dimming device disposed a fixed distance from said illumination source dimming the amount of light generated by said illumination source and emanated from said illumination system over a range of substantially from about 0 to 100%, said dimming device mechanically operating to define an optical passageway there through of variable cross sectional area, said dimming device comprising a plurality of overlapping blades mounted in a movable relationship relative to each other and disposed substantially perpendicular to a longitudinal axis passing through said illumination source and said dimming device and means for moving said blades relative to each other in response to user input, wherein each individual blade comprises an overlapping front segment, which is transparent and a non-overlapping rear segment, which is opaque, the overlapping segments being a color filter and the non-overlapping segments being a shutter.

The illumination source can be any light source powered by electrical energy including light sources not yet developed. Exemplary light sources include high intensity discharge (HID) lamps, such as a sodium vapor, mercury vapor, or metal halide lamps. Exemplary HID lamps that can be used include standard size HID lamps and compact HID lamps.

The existing HID product range consists of mercury vapor (MV), high pressure sodium (HPS), and quartz metal halide (MH) lamps. In recent years, ceramic metal halide lamps (for example, Philips MasterColor® series) have entered the market place. Compared to the conventional HID lamps, the ceramic metal halide lamps display excellent initial color consistency, superb stability over life (lumen maintenance >80%, color temperature shift <200K at 10,000 hrs), high luminous efficacy of >90 lumens/watt and a lifetime of about 20,000 hours. These highly desirable characteristics are due to the high stability of the polycrystalline alumina (PCA) envelopes and a special mixture of salts, which emits a continuous-spectrum light radiation close to natural light.

Additional useful light sources include any light source that cannot be dimmed by electrical means.

Figure 3:
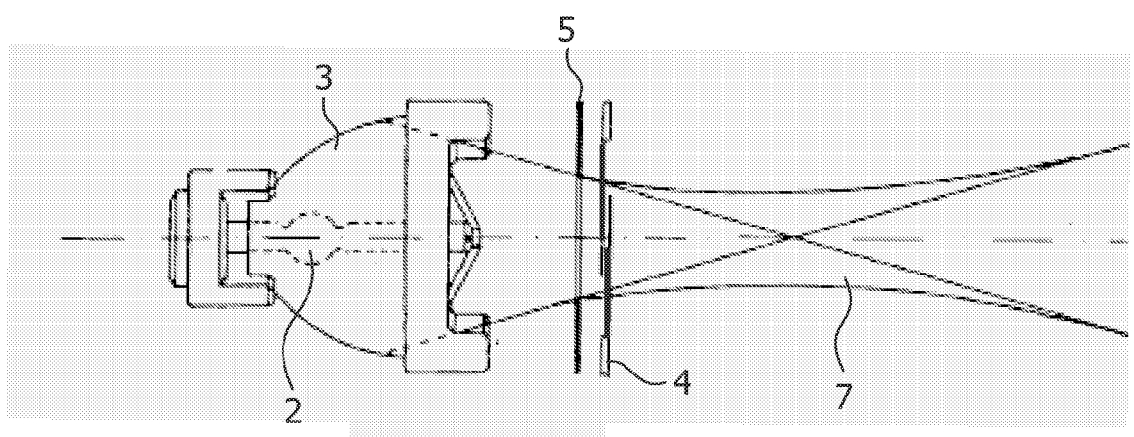
FIG. 3 shows an embodiment of the illumination device equipped with hatch (lid) type blades.

FIG. 3 shows a typical spot luminaire illumination system. There is depicted a illumination system generally characterized by the reference numeral 10, comprising an illumination source 2, a reflector 3 completely surrounding at least a portion of illumination source 2 for collecting and projecting light from the illumination source 2, and a dimming device 4 for dimming the quantity of light generated by illumination source 2 which is projected from the illumination system 10 and directed onto an object.

The illumination source 2, reflector 3 and dimming device 4 are axially located with respect to a central axis of the light beam 7 extended through the illumination source 10.

A source of power and associated hardware are not shown and are disposed in a chamber of housing, also not shown.

As shown in FIG. 3 this kind of illumination system comprises a high intensity discharge lamp, it is common to configure the system by combining the high intensity discharge lamp with a concave reflector.

The reflector typically comprises a metallic sheet, having like laterally and vertically spaced and curved sections to reflect light from the illumination source that is transmitted rearwardly and laterally. The reflected together with the direct light subsequently may travel to a diffuser plate 5. The latter diffuses the rays so that they then travel forwardly. Thus, all or substantially all light is used for illumination and provision is made for uniform, or substantially uniform light beam.

Shape and color of the light beam may be influenced by further optical components such as color filters, gobo wheels, strobe arrangements, beam splitters etc.

According to the invention the illumination system comprises an array of partially overlapping blades 1, the array of blades being mechanically operable to define an optical passageway there through of variable cross sectional area, wherein each blade comprises at least one overlapping segment and at least one non-overlapping segment.

In operation from an open position to a closed position first the leading edge of a front portion of each blade enters the cross sectional pathway area 6 of the light beam, thereafter a rear portion of the blade enters the cross sectional pathway area 6 until in an interlocking position the beam-stopping edges of the blades define.

The design of these device is driven by two primary considerations, the ability to dim the illumination source over the full operating range of from about zero to maximum and simultaneously changing the color of the light beam For this aim in each blade the overlapping front segments are a translucent color filter element and the non-overlapping rear segments are an opaque shutter element.

The borderline between transparent and opaque section is defined by the beam stopping edge, which marks the transition from overlapping area and non-overlapping areas in a closed position The dimming cross-sectional area as defined by the dimming device may be rectangular, square or circular. As a general rule the width of the dimming cross sectional area is larger than the width of the light beam.

The blades define a light-admitting opening in the dimming cross-sectional area (see FIG. 3) whose size can be varied by changing the angular position of the blades relative to each other.

Each non-overlapping segment forms a part of the dimming cross-section; the ensemble of all non-overlapping segments covers the dimming cross section completely.

The non-overlapping segment of the dimming blade is opaque to provide for complete dimming.

The transparency of the non-overlapping shutter segments may be intentionally modified to absorb, reflect, and transmit light to provide an illumination resembling a moon, stars and night colors (dark blue for example) in the sky.

Each overlapping segment of the dimmer blades is provided as a planar color filter to enable the color of the projected light to be changed as required.

Figure 4A:
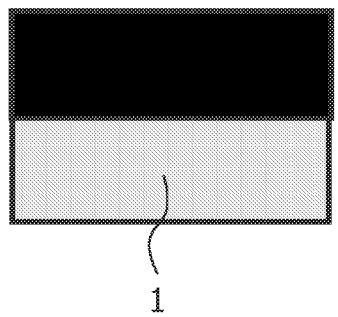
FIG. 4 shows three embodiments of the dimming blades according to the invention.

In the simplest embodiment the color filter segment is a monochromatic yellow, amber or red color filter (FIG. 4A)).

Figure 4B:
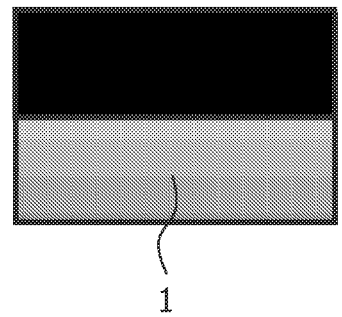

According to a further embodiment, the color filter segments are dichroic colour plates, known per se, of two of the three secondary colours, yellow, amber and red to allow cross-fading between any two colours (FIG. 4B)). Other combinations of two or more colour may be used.

According to a further embodiment the transparency of the color filter segment may be intentionally modified to absorb, reflect, and transmit light to provide an illumination that is either graduated or continuous.

Figure 4C:
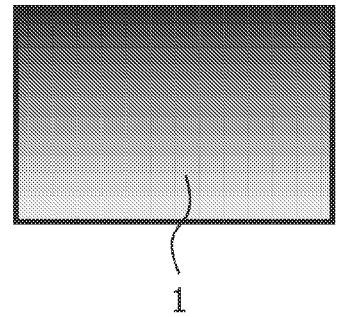

In these, a transparent plate is colored increasingly darker from yellow to red in a working (movement) direction, so that in the direction of work it passes in succession from full transparency (no coloring) to complete opacity (completely black), preferably continuously (FIG. 4C)).

The transparency of the color filter segment may be intentionally modified to absorb, reflect, and transmit light to provide an illumination resembling a cloudy sky or sunset color streaks in the sky.

The beam locking edge of the overlapping segment edges may be colored dark blue to produce night-light and to ensure cutting off of the light beam.

With regard to the design of the mechanical dimmer device a number of different basic designs are known, such as Venetian blind type shutters, iris diaphragms (as used in camera lenses), comb shaped shutters and hatches.

Figure 1:
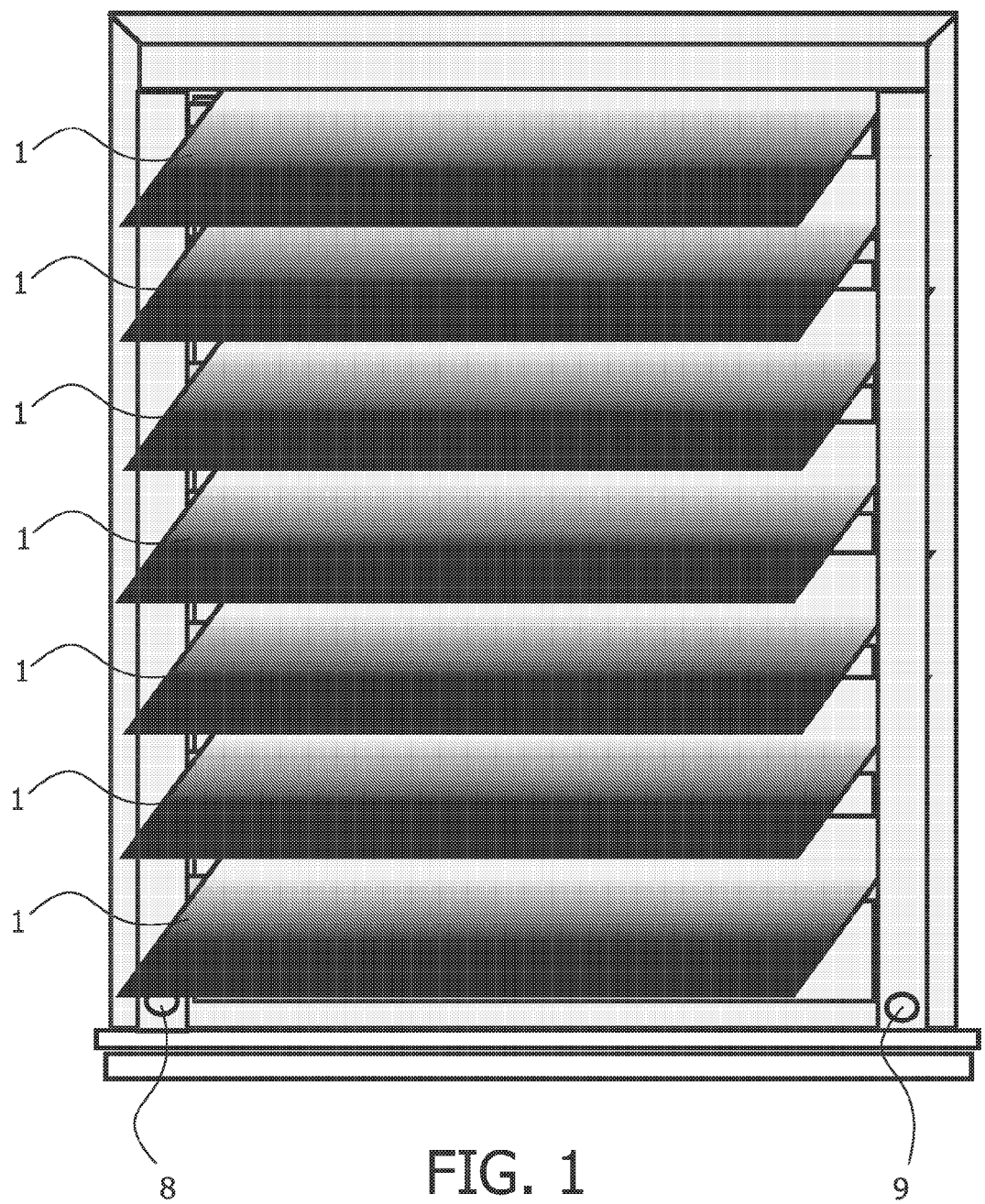
FIG. 1 shows an embodiment of the dimming device equipped with opened Venetian blind type blades.

According to a preferred embodiment of the invention as shown in FIG. 1 the dimming device is provided as a Venetian louvre type arrangement with an array of a plurality of parallel, narrow louvre-type blades which can swing in common around their longitudinal axes, especially for use in greater cross-sections of light beams.

The blades may be arranged lying horizontally or otherwise vertically. To actually secure the amount of overlapping among the blades to achieve sufficient shielding performance and to provide a favorable balance in the aspect ratio of the dimming device and effectively reduce the horizontal size, it is best that the dimming device has a 6- or 7-blade configuration as in the case of the embodiment shown in FIGS. 1 and 2.

Figure 5:
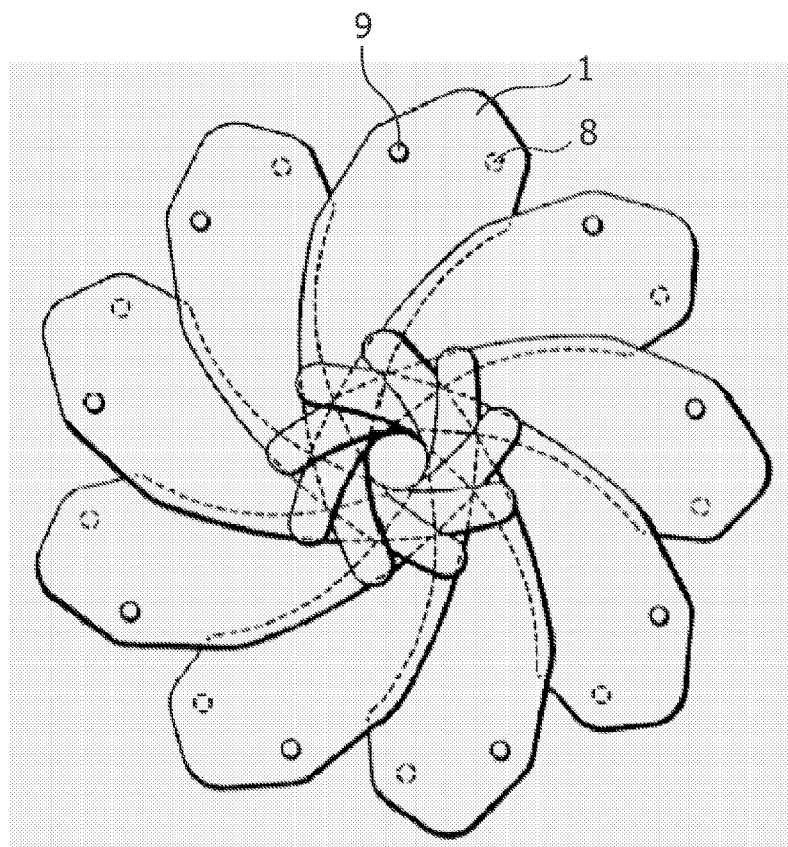
FIG. 5 shows an embodiment of the dimming device equipped with iris diaphragm type blades.

According to a further embodiment of the invention the dimming device is provided as an iris diaphragms type arrangement with an array of a plurality of overlapping blades being moveable to vary the diaphragm aperture, as shown in FIG. 5. The design resembles that of conventional iris-type diaphragms, found for example in cameras, projectors and spot lights.

Iris dimmers are typically composed of a plurality of curved, sickle-shaped opaque blades, carried in two concentric and intermeshing rings. The iris is operable to vary the diameter of an aperture formed by the inner edges of the blades. As the rings rotate, the blades pivot about pins, which secure each end of each blade to one or the other of the two rings, such that each blade is secured to one ring at one end and to the other ring at the other end. As the diameter of the aperture decreases, the amount of light, which can be projected through the iris is diminished.

In these iris-type configurations, where the dimming cross sectional area resembles a circle, the blades are typically formed as two-part claws or two-part sickles, each of blades being defined by an arc sector of a circle.

Figure 6:
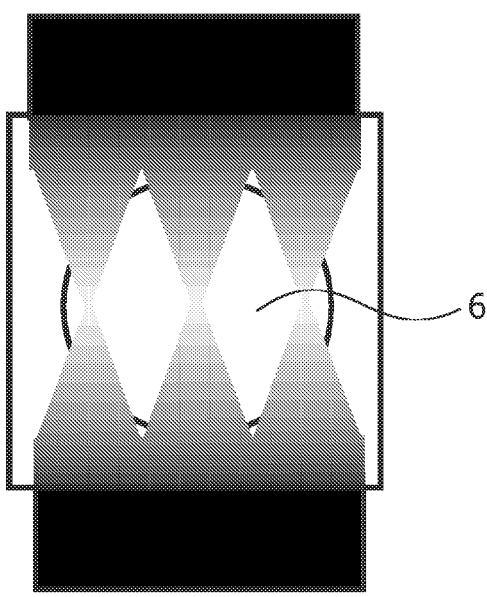
FIG. 6 shows an embodiment of the invention with comb-type blades.

In another preferred embodiment of the present invention the mechanical dimming device is comb-shaped (FIG. 6). Each blade has a width that narrows toward the tip, which is pointed, and the tips of the first subset of blades meet substantially at the centre of the aperture. The blades of the second subset also narrow to pointed tips and the tips meet substantially at the centre of the aperture. Thus, the first and second subsets of blades of this particular embodiment are capable of closing, for example, a diaphragm aperture substantially to zero.

According to a further embodiment of the invention, shown in FIG. 3 the dimming device is provided as a hatch-type arrangement with an array of two or more symmetrical dimmer blades are mounted evenly spaced around the beam path and actuated for coordinate pivoting movement into or out of the beam path in opposite directions.

The displacements of the blades are synchronized and take place in opposite directions, so that they offer an aperture of variable surface area to the passage of light beams.

Two dimmer blades can be mounted opposing each other across the beam path, or three dimmer blades can be mounted spaced 120 degrees around the beam path. A greater number of dimmer blades might also be used, with the blades mounted evenly spaced around the beam path. These plural, evenly spaced dimmer blades block filtered light from each of the color filter sets equally so as not to disturb or vary the color balance while dimming.

According to a further embodiment of the invention shown in FIG. 6 the dimming device is provided as a sliding gate-type dimmer with the blades lying horizontally or vertically and are laterally slideable in opposite directions.

In FIG. 6 is shown a pair of dimmer blades, each having a protruding saw teeth-shaped overlapping segments and each connected to movement control element operable to displace the blades towards and away from each other, sliding across each other.

For this embodiment, dimmer blades often feature a complex shape of the leading edge of the blade, such as serrated, ragged, or severely spiked leading edges, so that the dimming effect is less noticeably abrupt.

The displacements of the two blades are synchronized and take place in opposite directions, so that they offer an aperture of variable surface area to the passage of light beams.

In operation the parameters of a light beam projected by an illumination system can be varied by remote control, including the orientation of the light source with respect to pan and tilt, and the diameter, shape, divergence, color and intensity of the beam.

Particularly the adjusting means for changing the position of the dimmer blades in relation to each other typically comprises mechanical moving means and controlling means.

Operation control of the dimming device may be manual or by electronic control e.g. via DMX channels. Particularly the system may be coupled to a remote operating unit (not shown) in a manner known to those skilled in the art.

In a representative embodiment the electronic control includes a microprocessor control unit. The microprocessor is functional to control one or more operation modes of the lamp. For example, selectable lamp operation modes controlled by the microprocessor may include one or more of the following: an on-off switched mode; a flashing mode; a stroboscopic mode; a brightening mode; a dimming mode; and/or an auto-off mode. All of these effects can be controlled by software running on the microprocessor device. Typically the electronic control runs via DMX channels under the DMX-512 protocol.

The USITT DMX-512 protocol was originally designed to standardize the control of light dimmers by lighting consoles. The DMX-512 protocol is a multiplexed digital lighting control protocol with a signal to control 512 devices, such device including dimmers, scrollers, non-dim relays, parameters of a moving light, or a graphical light in a computerized virtual reality set. DMX-512 is used for control for a network of devices. The DMX-512 protocol employs digital signal codes. When a transmitting device, such as a lighting console, sends digital codes, a receiving device, such as a dimming device transforms these codes into a function command, such as dimming to a specified level.

In operation the mechanical moving means effectuate dimming operations to the desired illumination level in the range from zero to maximum.

When the blades are aligned with the light path, as shown in FIG. 1, no influence on the colour is created and the filters do not significantly interfere with the light path. Therefore, a white light beam is created for use as a spot or other desired use. As a given dimming device is pivoted so that the angle of incidence of the light increases above zero, the color filter segment of the blades moves across the light path and transmits a coloured beam with the color dependent on the pivoting angle.

Figure 2:
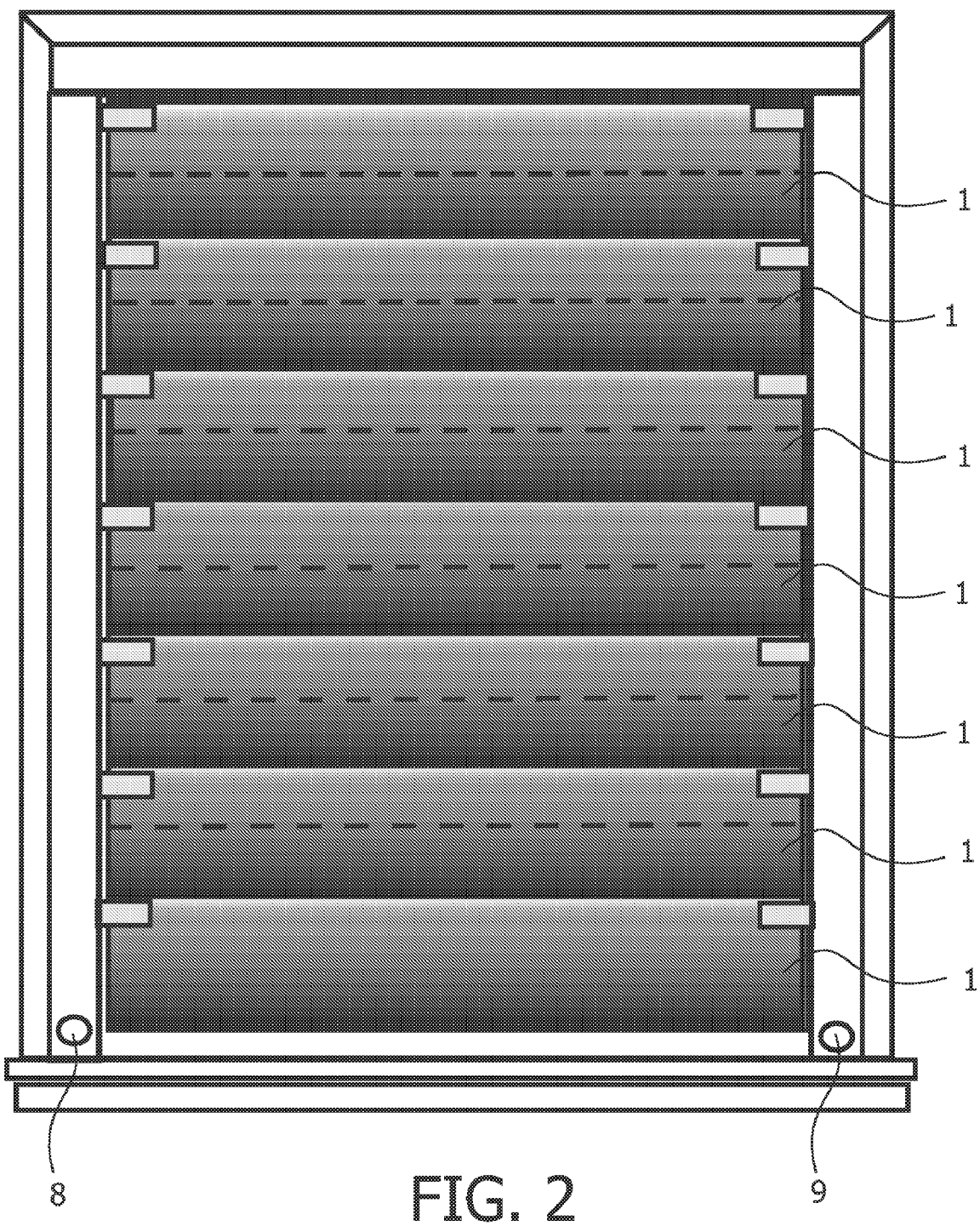
FIG. 2 shows an embodiment of the dimming device equipped with closed Venetian blind type blades.

That way the light source is progressively dimmed, thereby to reproduce the daylight effect of light. Thus, a fading daylight effect is created. When the operating means have been moved to bring the blades to fully closed position, the lower overlapping part of one blade overlaps the upper non-overlapping part of the blade next below (FIG. 2).

LIST OF NUMERALS 1 blade
2 illumination source
3 reflector
4 dimming device
5 diffuser plate
6 cross sectional passway
7 light beam
8 pivot
9 pivot
10 illumination system

The invention claimed is:

1. Illumination system, comprising an illumination source and a mechanical dimming device for dimming the amount of light generated by the illumination source and emanating from the lighting system, comprising an array of blades, the array of blades being mechanically operable to define an optical passageway therethrough of variable cross sectional area by progressively moving the blades into a light path so as to alter an amount of the light impinging thereon, wherein each blade comprises at least one overlapping segment and at least one non-overlapping segment, the overlapping segments being a color filter and the non-overlapping segments being a shutter, a leading edge of the blade adjacent the color filter.

2. Illumination system according to claim 1, wherein the illumination source is a high intensity lamp.

3. Illumination system according to claim 1, wherein a color of the color filter is in the range from yellow to amber to red.

4. Illumination system according to claim 1, wherein a color of the color filter changes from yellow to red from the leading edge to a beam-stopping edge defined by a borderline between the overlapping segment and the non-overlapping segment.

5. Illumination system according to claim 1, wherein the overlapping segment comprises a dark blue or opaque rim at beam-stopping edge defined by a borderline between the overlapping segment and the non-overlapping segment.

6. Illumination system according to claim 1, wherein the dimming device is a Venetian blind-type dimmer with the blades lying horizontally or vertically.

7. Illumination system according to claim 1, wherein the dimming device is an iris diaphragm-type dimmer with the blades movable to a central aperture.

8. Illumination system according to claim 1, wherein the dimming device is a hatch-type dimmer with the blades lying horizontally or vertically and pivotable in opposite directions.

9. Illumination system according to claim 1, wherein the dimming device is a sliding gate-type dimmer with the blades lying horizontally or vertically, the leading edges thereof moveable in opposite directions.

10. Illumination system according to claim 1, wherein a reflector is provided in conjunction with the illumination source.

11. An illumination attenuation device comprising a plurality of blades, each blade having a front segment having a leading edge and comprising a translucent color filter and a rear segment comprising an opaque shutter, the blades mountable downstream of a high-intensity light source for relative movement between an open position wherein at least some light passes through the blades without attenuation, through an intermediate position wherein front segments of adjacent blades overlap, admitting attenuated light therethrough, to a closed position wherein rear segments of adjacent blades abut so as to substantially block light from passing therethrough.

12. The illumination attenuation device recited in claim 11, wherein each blade front segment comprises a color gradient from yellow adjacent the leading edge to red adjacent a border between the front segment and the rear segment.

13. The illumination attenuation device recited in claim 11, wherein the blades comprise elongated, substantially planar blades arrayed with longitudinal axes substantially parallel, each blade rotatable about the longitudinal axis.

14. The illumination attenuation device recited in claim 11, wherein the plurality of blades are arrayed in an iris diaphragm arrangement.

15. The illumination device recited in claim 11, wherein the plurality of blades comprise a pair of opposed blades having leading edges facing each other when in the open position, the blades movable toward each other from the open to the closed position.

16. The illumination device recited in claim 15, wherein the blades leading edges comprise a sawtooth configuration.

17. A method for attenuating illumination comprising:
   mounting a plurality of blades for movement downstream of a high-intensity light source, each blade having a front segment having a leading edge and comprising a translucent color filter and a rear segment comprising an opaque shutter; and
   moving the blades relative to each other between an open position wherein at least some light passes through the blades without attenuation, through an intermediate position wherein front segments of adjacent blades overlap, admitting attenuated light therethrough, to a closed position wherein rear segments of adjacent blades abut so as to substantially block light from passing therethrough.

18. The method recited in claim 17, wherein the blades comprise elongated, substantially planar blades arrayed with longitudinal axes substantially parallel, and wherein the blade moving comprises rotating each blade about the longitudinal axis.

19. The method recited in claim 17, wherein the plurality of blades are arrayed in an iris diaphragm arrangement, and wherein the blade moving comprises pivoting the blades to change an aperture formed thereby.

20. The method recited in claim 17, wherein the plurality of blades comprise a pair of opposed blades having leading edges facing each other when in the open position, and wherein the blade moving comprises moving the blades toward each other from the open to the closed position.

* * * * *